United States Patent [19]
Haas

[11] Patent Number: 5,375,006
[45] Date of Patent: Dec. 20, 1994

[54] TWISTED NEMATIC LIQUID CRYSTAL DISPLAY DEVICES WITH OPTICAL AXIS OF BIREFRINGENT LAYER INCLINED WITH RESPECT TO BIREFRINGENT LAYER NORMAL

[75] Inventor: Gunther Haas, Meylan, France

[73] Assignee: Thomson Consumer Electronics S.A., Courbevoie, France

[21] Appl. No.: 80,873

[22] Filed: Jun. 24, 1993

[30] Foreign Application Priority Data

Jun. 26, 1992 [FR] France .................. 92 07831

[51] Int. Cl.⁵ .......................................... G02F 1/1335
[52] U.S. Cl. ........................................ 359/73; 359/63
[58] Field of Search .................. 359/73, 63, 40

[56] References Cited

FOREIGN PATENT DOCUMENTS

| | | |
|---|---|---|
| 272820 | 6/1988 | European Pat. Off. . |
| 349900 | 1/1990 | European Pat. Off. . |
| 350383 | 1/1990 | European Pat. Off. . |
| 63-239421 | 10/1988 | Japan .................. 359/73 |
| 4-113301 | 4/1992 | Japan . |
| 4-120512 | 4/1992 | Japan . |

OTHER PUBLICATIONS

IBM Technical Disclosure Bulletin, vol. 33, No. 12, May 1991, pp. 201-202. "Multicolor Parallel-Oriented Nematic Liquid Crystal Displays Using Optical Compensation Films".

*Primary Examiner*—Anita Pellman Gross
*Attorney, Agent, or Firm*—Oblon, Spivak, McClelland, Maier & Neustadt

[57] ABSTRACT

The disclosure relates to electrically controlled display devices that use the polarization rotation properties of twisted nematic liquid crystal layers. A display device comprises an optical cavity formed by two polarizers enclosing a layer of twisted nematic liquid crystal with which uniaxial birefringent means are associated in order to compensate for the residual birefringence of the liquid crystal layer which tends to reduce the contrast ratio of the display device. Thus, the homogeneity of the angular distribution of the contrast ratio is improved in relation to a device having no compensating means. The disclosed device can be applied in particular to data display devices for computers and to the display of television pictures directly or by projection.

14 Claims, 8 Drawing Sheets

TWISTED NEMATIC LIQUID CRYSTAL DISPLAY DEVICES WITH OPTICAL AXIS OF BIREFRINGENT LAYER INCLINED WITH RESPECT TO BIREFRINGENT LAYER NORMAL

BACKGROUND OF THE INVENTION

The present invention relates to electrically controlled electro-optical devices that enable the display of images, directly by transmission on a panel that modulates light or indirectly by projection on a screen. The invention relates more particularly to devices making use of a liquid crystal placed between two crossed polarizers and having a twisted nematic structure when there is no modulating electrical field. In this configuration, the transparency can be made to decrease when the liquid crystal cell is subjected to an increasing electrical voltage. The displayed image has a defect of uniformity that depends on the angular conditions of observation. To reduce this drawback, the invention proposes to associate one or more compensating blades or plates, formed by a uniaxial birefringent optical medium, with the liquid crystal layer, the unit thus formed being placed between the two crossed polarizers. This technique can be used to obtain a far more homogeneous contrast ratio in a wider angle of observation.

SUMMARY OF THE INVENTION

An object of the invention, therefore, is an electrically controlled display device implementing a layer of twisted nematic liquid crystal placed between two polarizers, wherein uniaxial birefringent compensating means are associated with said layer within the optical cavity formed by said polarizers.

An object of the invention is also an electrically controlled display device as described here above, wherein the presence of the compensating means makes it possible to cancel a defect of symmetry which can be attributed to the electrical control field on the twisted or helical arrangement of the molecules of the liquid crystal in nematic phase. This arrangement, which is particularly advantageous for display by projection, consists in using a compensating plate whose optical axis shows a slight inclination with respect to the normal to the faces that bound the layer of liquid crystal. One alternative embodiment uses a compensating system with two superimposed uniaxial plates having orthogonal optical axes so that, under normal incidence, the system behaves like an isotropic medium. One of the optical axes is then slightly inclined with respect to faces of the liquid crystal layer and the other optical axis is parallel to them.

BRIEF DESCRIPTION OF THE DRAWINGS

The invention will be understood more clearly through the following figures and the appended drawings, of which.

MORE DETAILED DESCRIPTION

Figure 1:
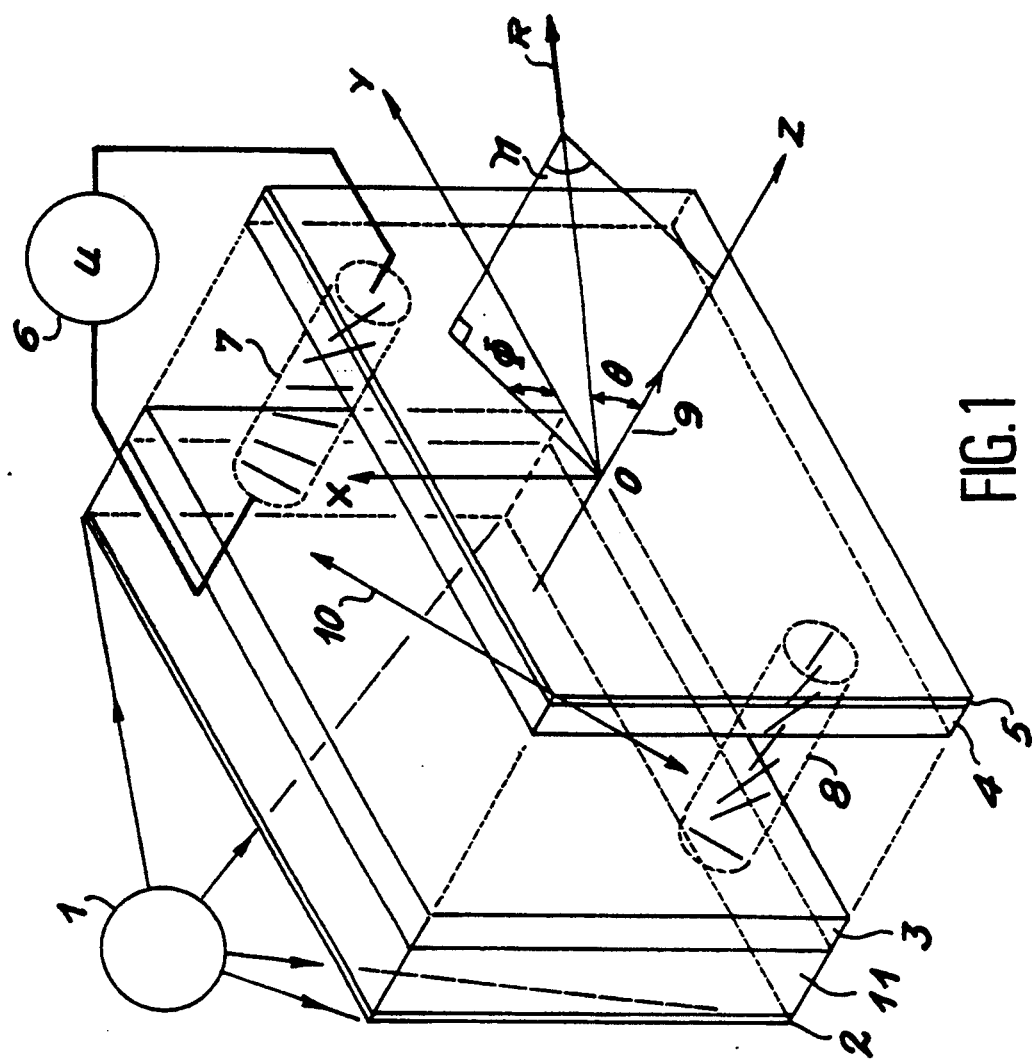
FIG. 1 is an isometrical view of a display device according to the invention.

FIG. 1 shows two transparent supporting plates 3 and 4 that bound a cavity with parallel faces treated by means of surfactants and by a method of alignment, in order to communicate particular orientations to the molecules of a nematic liquid crystal that fills this cavity. The cylindrical zone 7 illustrates this twisted molecular orientation when there is no controlling electrical field. In the immediate vicinity of the plate 3, the molecules are oriented in the direction 10 which is inclined by 45 degrees to the axes X and Y. In the immediate vicinity of the plate 4, the molecules are oriented in the direction 9 which is orthogonal to the direction 10. At mid-distance from the internal faces of the plates 3 and 4, the liquid crystal molecules are oriented along the axis X which is assumed to correspond to the vertical direction of the display device. The plates 3 and 4 are equipped with transparent electrodes connected to an electrical generator 6 in order to create an electrical field with a direction Z and an intensity proportional to the voltage u delivered by the generator 6. This electrical control field modifies the twisted molecular orientation as shown in the cylindrical zone 8. When there is no control field, the molecular orientation is symmetrical and capable of bringing about a 90° rotation in the rectilinear polarization of a light radiation that penetrates the liquid crystal layer through one of its main faces and emerges through its other main face. If the assembly 3-4 is placed between a polarizer 2 and an analyzer 5 in such a way that these elements dictate the directions 10 and 9, it is seen that the twisted orientation 7 will enable the light produced by the light source 1 to go through display device as efficiently as possible, this result being achieved when there is no electrical control field, which characterizes an ON state. On the contrary, the action of an electrical control field will have the effect of reducing the rotating capacity of the liquid crystal layer and, by this very fact, the crossed polarizers will have a shutter effect on the light, corresponding to an OFF state.

Figure 2:
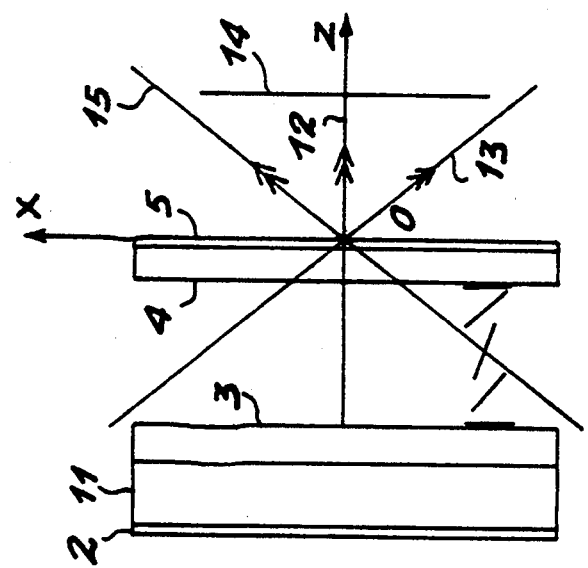
FIG. 2 is a view in profile of the device of FIG. 1.

Between the polarizer 2 and the transparent plate 3, or else between the plate 4 and the analyzer 5, provision has been made, according to the invention, for the addition of a compensating element 11 which, in a non-restrictive example, may take the form of a plate with parallel faces cut out of a uniaxial birefringent medium, the optical axis of which is directed along the axis OZ. Without this element, the device of FIGS. 1 and 2 is of a known type and its electro-optical properties are described by the graphs of FIGS. 3 and 4. As an example, the characteristics of a twisted nematic liquid crystal display device are:

MERCK ZU-3347 type liquid crystal;
Difference in optical path $(n_e - n_o)d$: 476 nm;
Helix angle: 90°
Pre-inclination of the liquid crystal molecules when there is no electrical field: 2°
Type of polarizers: SANRITZ LLC2 8218S
Voltage in ON state: 1.74 volts
Voltage in OFF state: 5.40 volts
Wavelength of light: 550 nm FIG. 3 expresses the transmission factor T as a function of the control voltage u. FIG. 4 uses two curves to express the angular properties, i.e. the variation of the contrast ratio CR with the direction of the light ray R. Referring to FIG. 1, it is seen that the angular coordinates of the light ray are $\Phi$ and $\theta$. The coordinate $\Phi$ gives the orientation of the plane $\pi$ which contains R and Z. The coordinate $\theta$ fixes the orientation of R with respect to Z.

The curve $\Phi = 0$ shows how the contrast ratio varies during a horizontal angular scan while the curve $\Phi = \pi/2$ relates to a vertical angular scan. It can be seen that the result is symmetrical for a horizontal scan while it is symmetrical and offset rightwards for a vertical scan. The asymmetry and the rightward offset can easily be understood by examining the view in profile of FIG. 2. It is seen that the molecules change over to the direction OZ in rotating on themselves in the sense determined by the angle of pre-inclination, instead of remaining substantially parallel to the faces of the liquid crystal layer. Thus, during a vertical angular scan, as indicated by the arrow 14, the residual birefringence of the layer only increases, and this explains the offset in FIG. 4.

Figure 3:
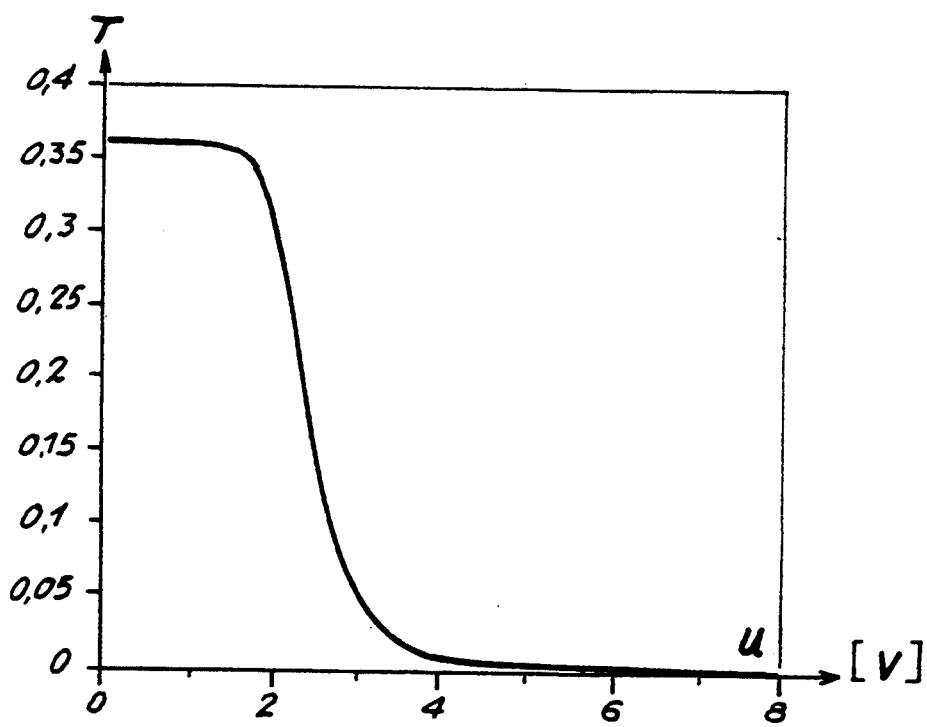
FIG. 3 is a graph explaining the working of the liquid crystal cell of FIG. 1.
Figure 4:
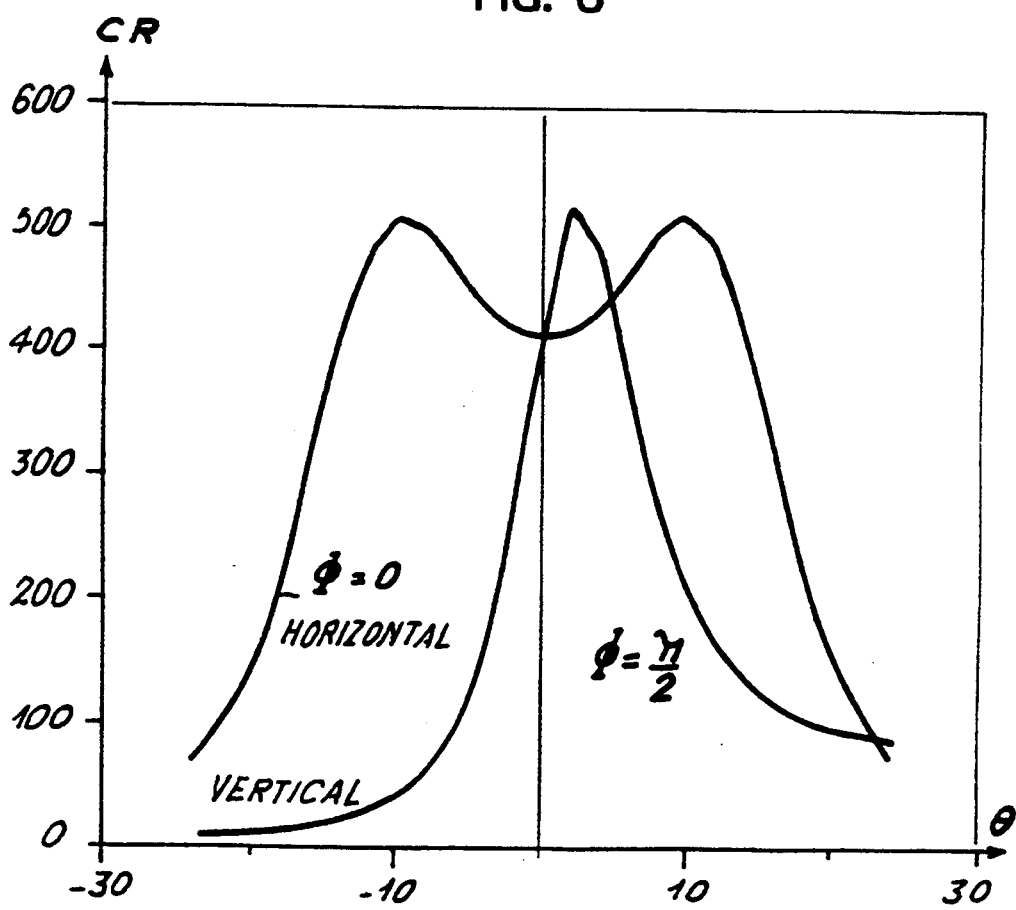
FIG. 4 is a graph specifying the angular response of the liquid crystal cell of FIG. 1, when there is no compenating means.

The curves of FIGS. 3 and 4 are based on the assumption that an element 11 introduces no compensation by birefringence.

Figure 5A:
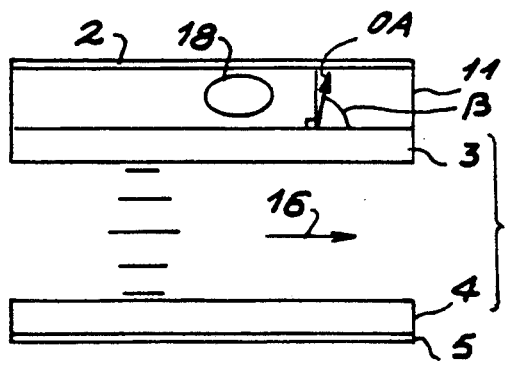
FIG. 5 is a view in profile (a) and a front view (b) of a first alternative embodiment of the invention.
Figure 5B:
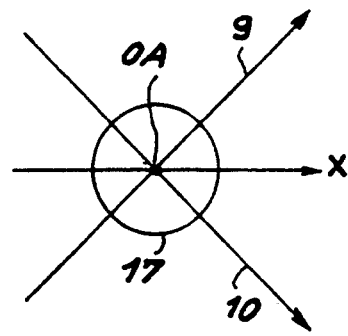

According to a first alternative embodiment of the invention as illustrated in FIG. 5, the compensating means 11 take the form of a uniaxial medium with negative birefringence, the optical axis OA of which is in the plane XZ and forms an angle ($\beta$) of 75° to 90° with the face of the liquid crystal layer. The arrow 16 indicates the molecular pre-inclination. At (b), it is seen that the section 17 of the ellipsoid corresponding to the refraction indices is circular for propagation parallel to the axis OA. To determine the values of the performance characteristics of a display device, reference may be made to an integrated contrast ratio (ICR) the mathematical expression of which is the following:

$$ICR(\alpha) = \frac{\int_0^{2\pi} d\Phi \int_0^{\alpha} d\theta \, T(\theta, \Phi, U_{off})}{\int_0^{2\pi} d\Phi \int_0^{\alpha} d\theta \, T(\theta, \Phi, U_{on})}$$

where: $\alpha$ is the aperture half angle of an integration cone, and $T(\theta, \Phi, U_{off})$ et $T(\theta, \Phi, U_{on})$ are the factors of transmission for the ON and OFF states.

Figure 18:
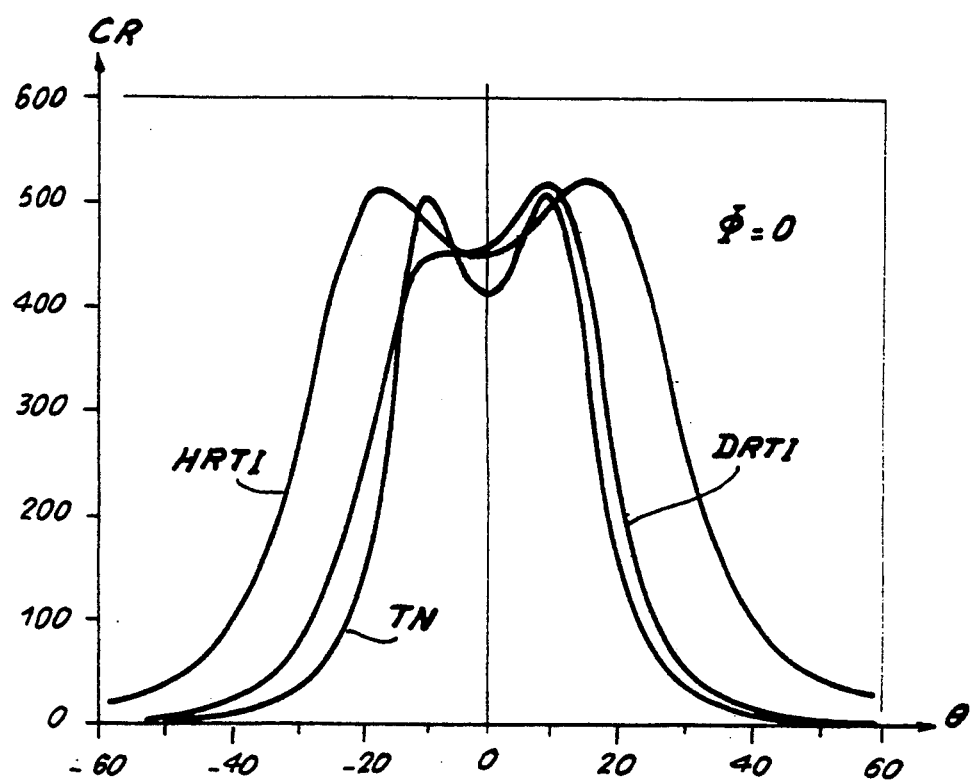
FIGS. 18 and 19 illustrate the angular dependence of the contrast ratio with compensating elements having their optical axis slightly inclined either with respect to the faces of the liquid crystal layer or with respect to their normal.
Figure 19:
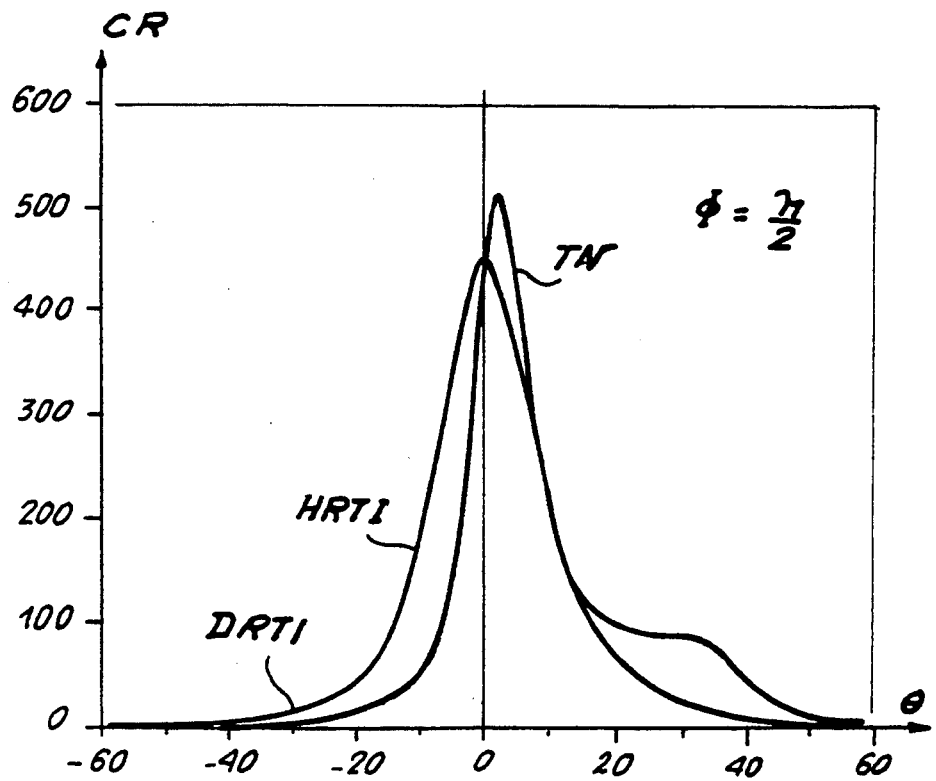

Adopting a difference in optical path of −390 nm for the compensating element and an angle of the optical axis of 83°, the magnitude ICR (20°) is equal to 187 whereas, for a liquid crystal cell without any compensating element, a value of 77 is obtained. A compensating such as this may be formed by a discotic liquid crystal with homogeneous pre-inclination. The curves referenced HRTI in FIGS. 18 and 19 refer to this alternative embodiment. FIG. 19 shows that the offset of the curve HRTI is cancelled while it can be seen in the curve TN, which represents the angular variation of a liquid crystal cell without compensating element 11. FIG. 18 shows that, in the horizontal direction, the compensating 11 widens the angular distribution of the contrast ratio CR.

Figure 6A:
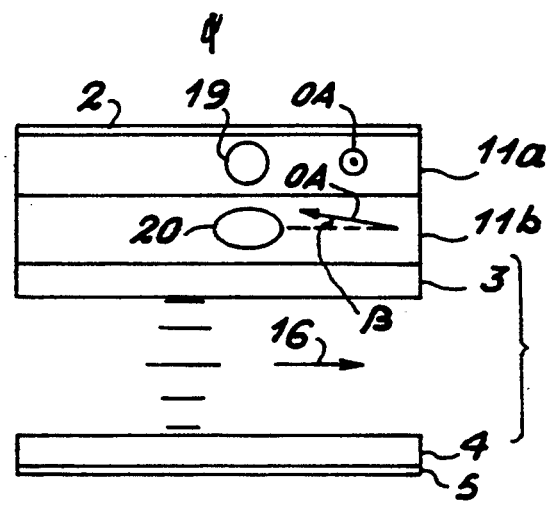
FIG. 6 is a view in profile (a) and a front view (b) of a second alternative embodiment of the invention.
Figure 6B:
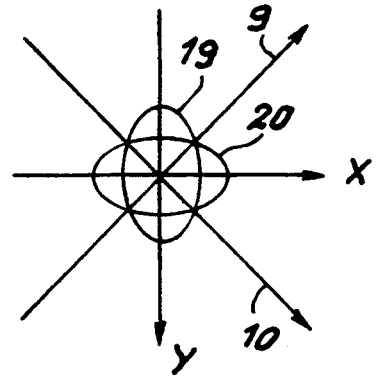

The compensation illustrated in FIG. 5 uses only one element 11 with negative birefringence which has isotropic properties for a light wave being propagated along the optical axis. As can be seen in FIG. 6, it is possible to obtain a similar result by using two juxtaposed compensating elements 11a and 11b with juxtaposed birefringence. These elements introduce the same path differences but, since their optical axes OA are orthogonal, the assembly has an isotropical behavior in a direction of propagation that has little inclination with respect to the axis Z. The optical axis OA of the element 11a is oriented perpendicularly to the plane of the figure, while the optical axis 11b is inclined by an angle ($\beta$) of 0° to 15° with respect to the faces of the liquid crystal layer. The compensating element 11b may be constituted by a liquid crystal layer. As a non-restrictive example, the compensating doublet of FIG. 6 includes elements with a path difference of 440 nm and the optical axis OA of the element 11b is inclined by 6.5°. An integrated contrast ratio ICR (20°) of 182 is obtained. The curves DRTI of FIGS. 18 and 19 give indications on the angular distribution of the contrast ratio CR for this type of compensation.

Figure 7A:
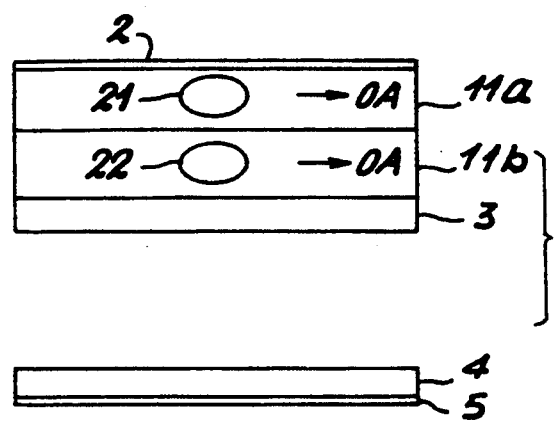
FIG. 7 is a view in profile (a) and a front view (b) of a third alternative embodiment of the invention.
Figure 7B:
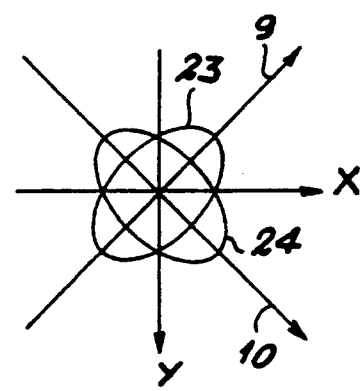
Figure 8:
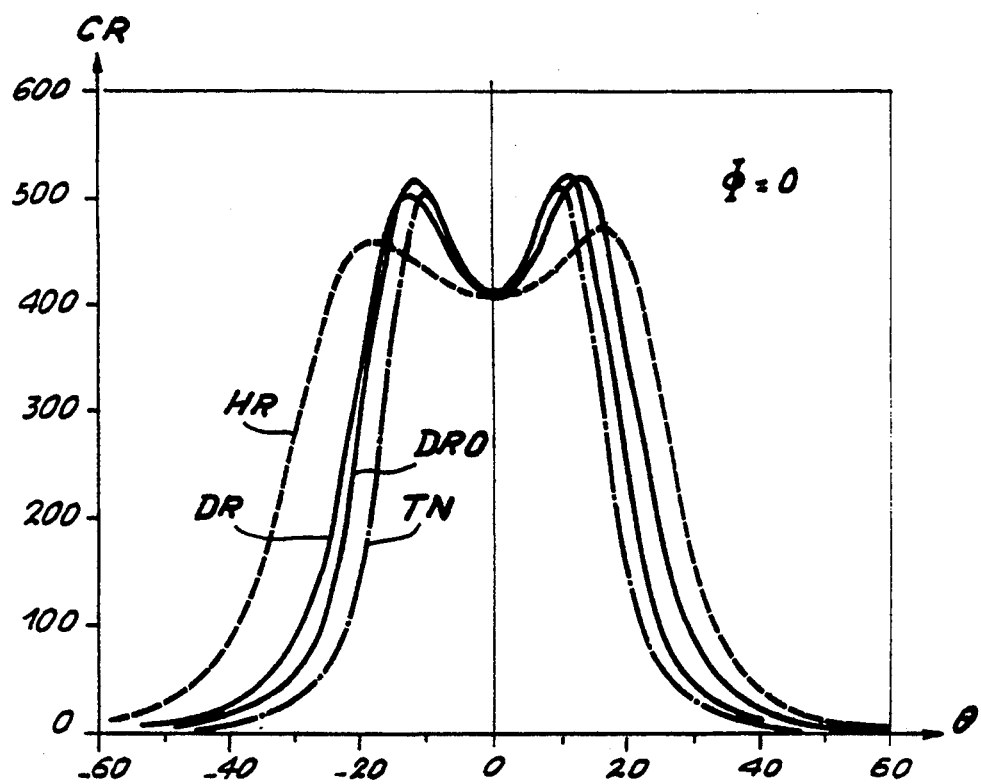
FIGS. 8 and 9 illustrate the improvements obtained with regard to the angular dependence of the contrast ratio.
Figure 9:
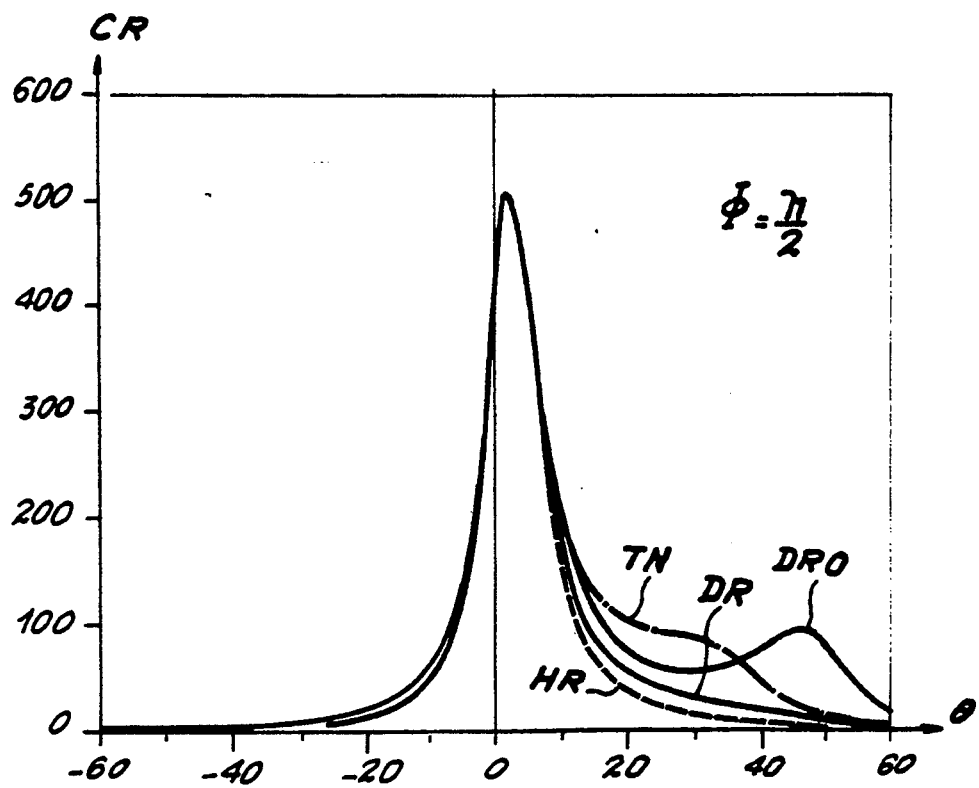

One simplification consists in using compensating elements with optical axes that are perpendicular or parallel to the faces of the liquid crystal layer. With this simplification, the example of FIG. 5 can be used to obtain the angular results illustrated by the curves HR of FIGS. 8 and 9. The simplification applied to the case of FIG. 6 gives the angular results illustrated by the curves DR of FIGS. 8 and 9. In FIG. 6, the sections 19 and 20 of the ellipsoid of the indices have their big axes pointed along X and Y. FIG. 7 shows another alternative embodiment which differs from that of FIG. 6 by the fact that the big axes of the sections 23 and 24 of the ellipsoid corresponding to the refraction indices are oriented in the directions 9 and 10. The sections 21 and 22 correspond to the plane of FIG. 7. The variant of FIG. 7 gives the angular results illustrated by the curves DRO of FIGS. 8 and 9.

One consequence of the simplification described here above is that, in the vertical direction, the offset of the curves is not cancelled. This does not entail any problems for a display device with direct viewing. In the embodiments already described, the case of FIG. 5 corresponds to the implementation of a negative uniaxial birefringent medium. The cases illustrated in FIGS. 6 and 7 implement positive uniaxial birefringent media.

Figure 10:
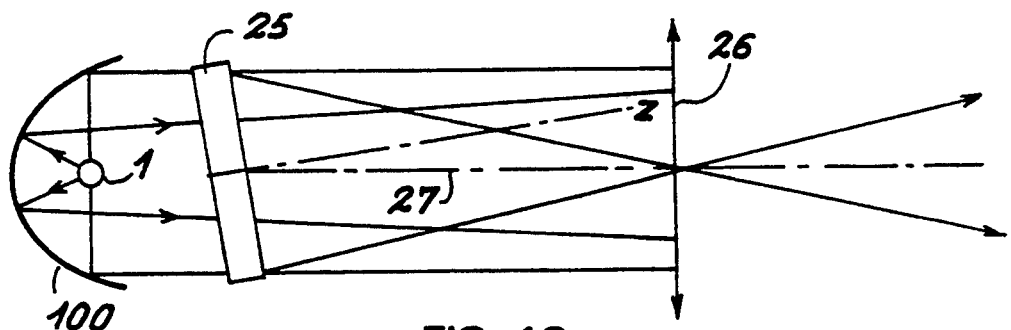
FIG. 10 shows a schematic view of a known type of projection display device.

FIG. 10 shows a projection system comprising a twisted nematic liquid crystal display device 25, associated with a light source 1 provided with a reflector 100.

Figure 11:
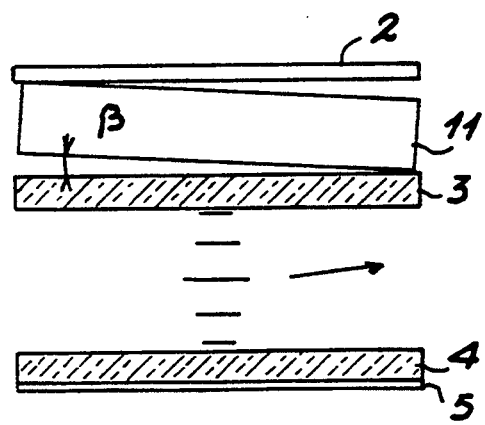
FIGS. 11 and 12 use views in profile to illustrate other alternative embodiments of the invention.
Figure 12:
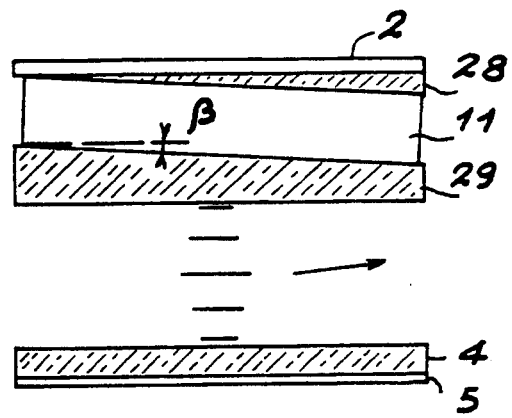

The projection on a screen is provided by a lens 16 and, given the offset of the maximum of contrast observed in the vertical direction for a display device with no compensation, it is seen that the device 25 needs to be inclined with respect to the optical axis 27, so that the illumination is at the optimum level in the direction of the optical axis. It is also possible to offset the device 25 with respect to the optical axis of the lens to obtain the same result. In both cases, it is seen that these measurements do not provide for the most efficient use of the projection lens since the device 25 is not accurately positioned from the viewpoint of optical imaging. A solution has already been proposed here above to this problem. This solution consists in using uniaxial birefringent media having a slightly inclined optical axis, either with respect to the normal to the faces of the liquid crystal layer or with respect to these faces themselves. Since this approach is difficult to implement, FIGS. 11 and 12 show other approaches that are easier to implement. The single or double compensating element 11 is no longer positioned in parallel to the liquid crystal layer but has an inclination β which, with compensating elements having optical axes that are parallel or perpendicular to the input and output faces, make it possible ultimately to obtain a cancellation of the offset of the curve of the contrast ratio in the vertical direction.

In FIG. 11, the layer of twisted nematic liquid crystal is a layer of uniform thickness, imprisoned between two transparent plates 3 and 4 with parallel faces. The polarizer 2 is held in position at a certain distance from the plate 2 and between these two elements. A birefringence compensator 11, having parallel input and output faces with an inclination β, is positioned obliquely. With its surrounding elements, the compensator 11 forms two air prisms. Since the light crosses many air-glass diopters, a loss by internal reflection reduces the quantity of light transmitted and lowers the quality of the images. To overcome this drawback, FIG. 12 suggests replacing the plate 3 by the prism 29 with an angle β and suggests providing, between the polarizer 2 and the compensator 11, for another prism 28 which eliminates any air gap.

Figure 14:
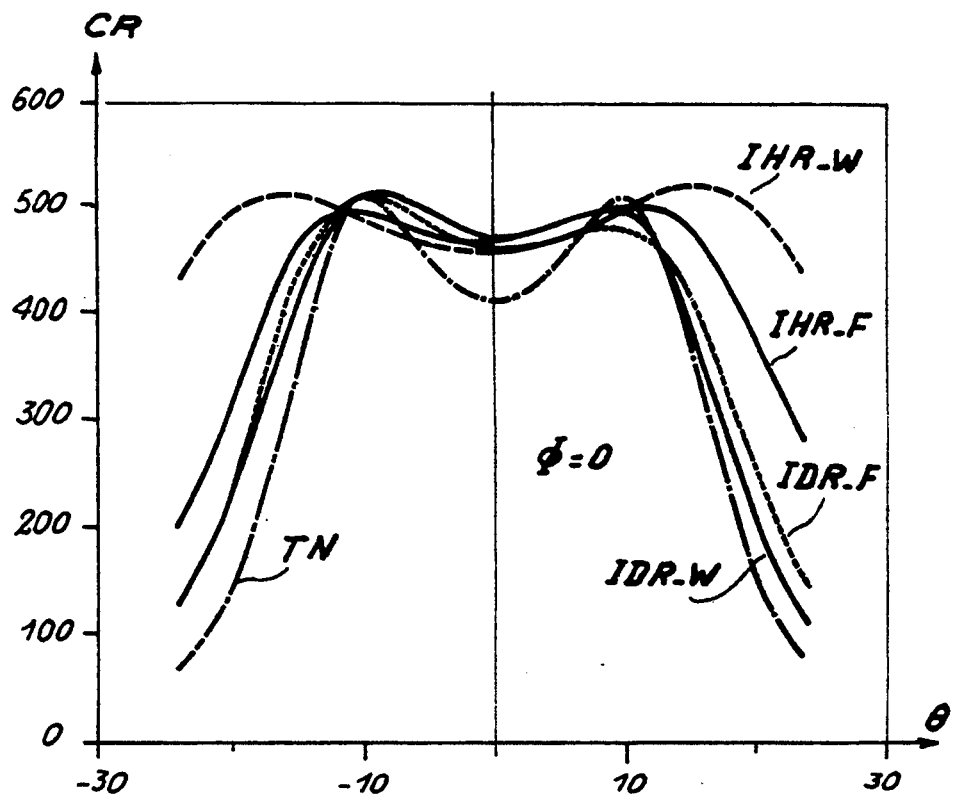
FIGS. 14 and 15 illustrate the improvements obtained with regard to the angular dependence of the contrast ratio.
Figure 15:
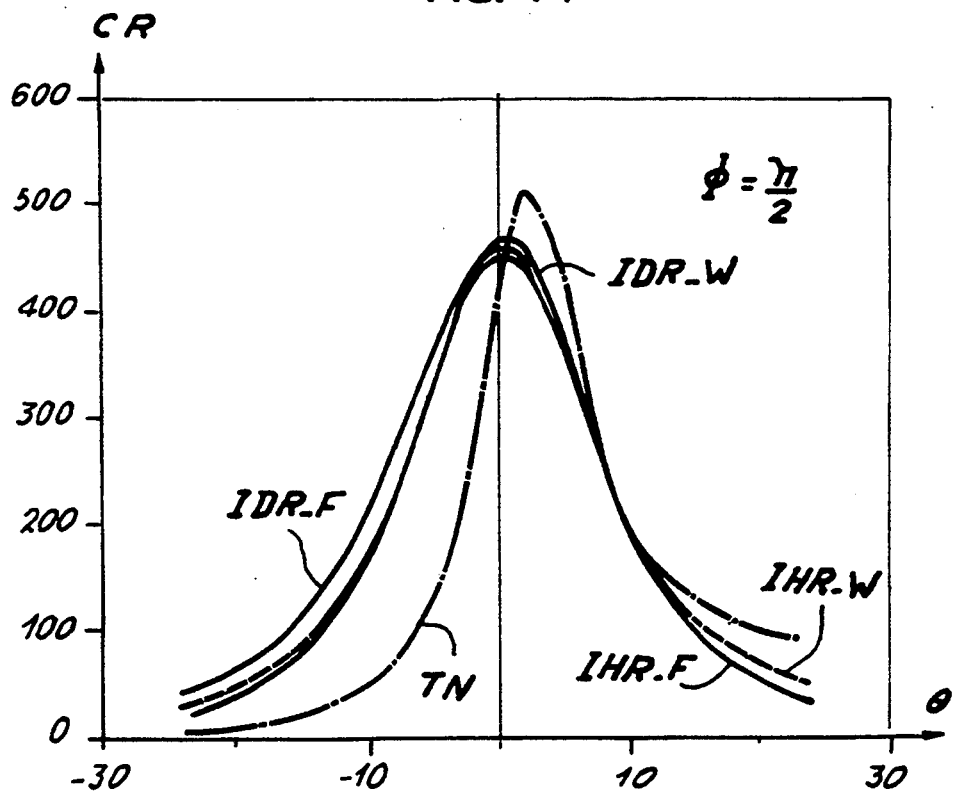
Figure 16:
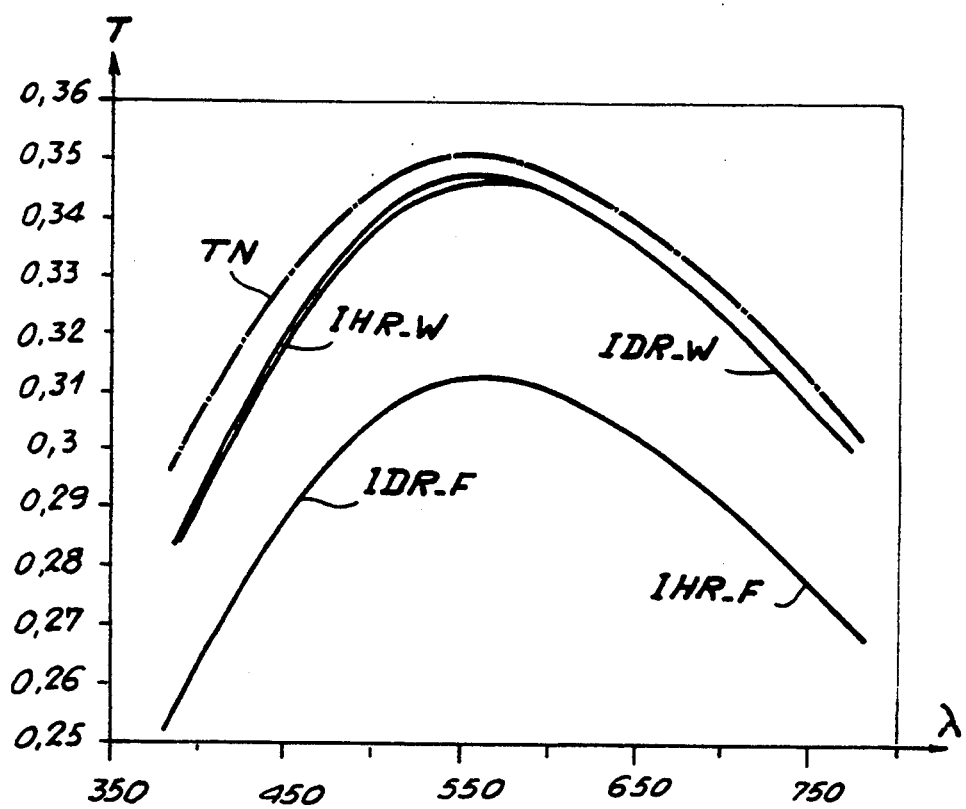
FIGS. 16 and 17 illustrate the dependence in terms of wavelength of the transmission factor, respectively for the ON state and for the OFF state.
Figure 17:
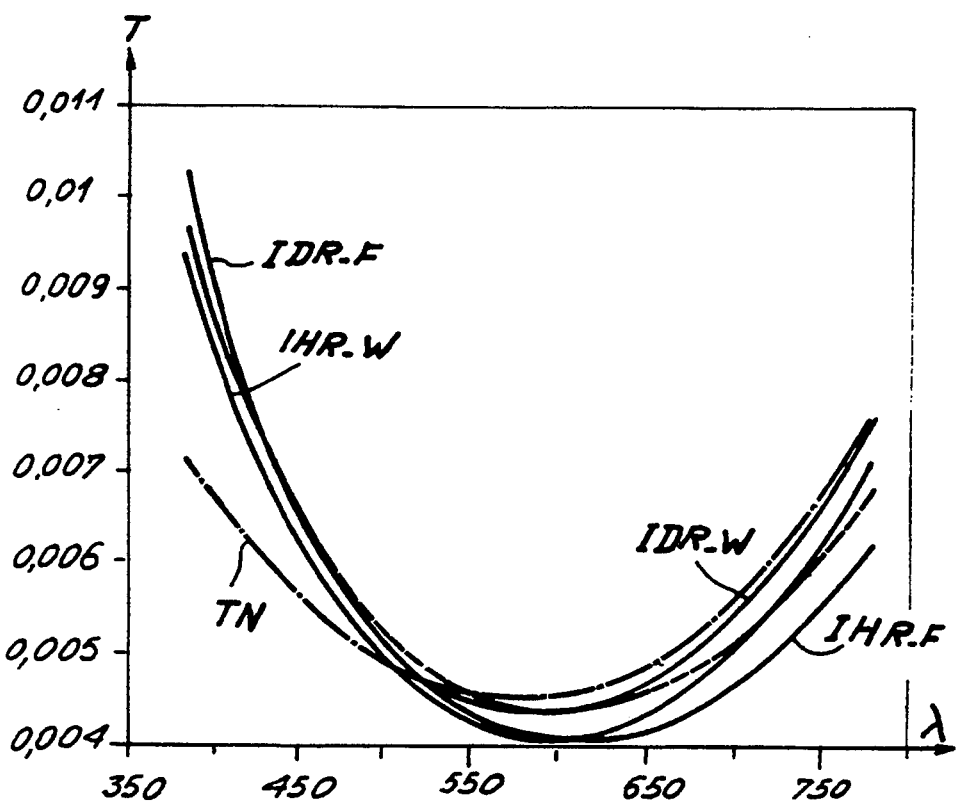

As a non-restrictive example, the configuration of FIG. 11 may be achieved with a single compensating element having the optical axis perpendicular to its input and output faces. Taking a path difference of less than −450 nm and an angle β of 10°, an integrated contrast ratio (ICR(20°)=205 is obtained. The corresponding curves of angular distribution are referenced IHR-f in FIGS. 14 and 15. The curves of the FIGS. 16 and 17 having the same reference illustrate the dependence of the transmission factors T in the ON and OFF state on the wavelength λ.

Referring to FIG. 11, with a double compensating element of the type illustrated in FIG. 6, and taking a path difference of 475 nm and an angle β of 10°, an integrated contrast ratio ICR(20°)=190 is obtained. This case is illustrated in FIGS. 14 to 17 by the curves referenced IDR-w.

Referring to FIG. 12, with a double compensating element of the type illustrated in FIG. 5, and taking a path difference of −380 nm and an angle β of 7°, there is an integrated contrast ratio ICR(20°)=187. This case is illustrated in FIGS. 14 to 17 by the curves referenced IHR-w.

Referring to FIG. 12, with a double compensating element of the type illustrated in FIG. 6, and taking a path difference of −500 nm and an angle β of 6°, there is an integrated contrast ratio ICR(20°)=173. This case is illustrated in FIGS. 14 to 17 by the curves referenced IDR-w.

Figure 13:
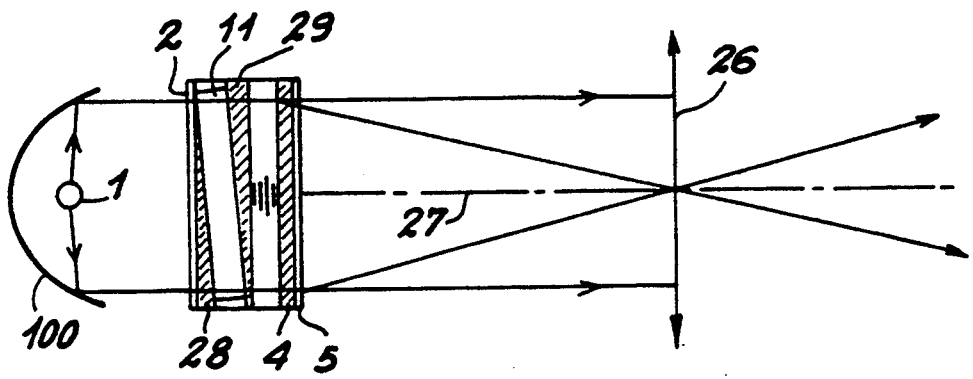
FIG. 13 is a drawing of a projection display device according to the invention.

FIG. 13 shows a diagram of a projection system equipped with a display device according to FIG. 12. The conditions of the formation, by the lens 26, of an enlarged image are ideal and the angular distribution of the contrast ratio is symmetrical with respect to the optical axis in the horizontal and vertical directions.

According to the above description, it is seen that the fact of associating a uniaxial birefringent compensating element with a twisted nematic liquid crystal layer always gives an improved horizontal angular distribution of the contrast ratio. By appropriately inclining the optical axis of the birefringent medium constituting the compensating element in relation to the faces of the liquid crystal layer, it is furthermore possible to eliminate the offset of the vertical angular distribution. When the compensating element is made with a single plate, with the optical axis perpendicular to the input and output faces, it is seen that the rectilinear polarization is kept for a crossing of the plate at normal incidence. This is also true of the version using two superimposed plates, for the path difference produced by the first plate is cancelled by the other plate.

The improvements made to the twisted nematic liquid crystal devices are optical. They can be applied notably to the display devices with passive or active matrices, such as those used as computer screens, or for flat screen applications in television. It is also possible to apply these improvements to projection systems as well as to view-finders for video cameras, both professional and those available in the large-scale consumer market.

The above description has been given purely as a non-restrictive example and it goes without saying that other variants can be contemplated without going beyond the scope of the invention.

What is claimed is:

1. An electrically controlled display device implementing a layer of twisted nematic liquid crystal placed between two polarizers, uniaxial compensating means with negative birefringence being associated with said layer within the optical cavity formed by said polarizers, wherein the optical axis of said uniaxial compensating means with negative birefringence have an inclination with respect to the normal (Z) to the main faces of said layer.

2. A device according to claim 1, wherein the molecular orientation of said layer, when there is no electrical control voltage, is adjusted to bring about a 90° rotation of the rectilinear polarization of a light wave that goes through it in the direction that is normal (Z) with respect to its main faces, said polarizers having crossed polarization directions respectively aligned with the rectilinear polarization of said light wave at said main faces.

3. A device according to either claim 1 or 2, wherein said compensating means comprises a birefringent plate with parallel faces, said optical axis being that of the medium constituting said plate.

4. A device according to claim 3, wherein said parallel faces are parallel to said main faces.

5. A device according to claim 3, wherein the orientation of said parallel faces in relation to said main faces gives rise to said inclination.

6. A device according to claim 5, wherein the stacking of said liquid crystal layer, said compensating means, and said polarizers, is achieved by interposing wedge-shaped refringent means.

7. A device according to either of claims 1 or 2, wherein said compensating means comprises a pair of uniaxial birefringent plates, each of said birefringent plates having parallel faces, said birefringent plates having orthogonal optical axes.

8. A device according to claim 7, wherein the slow axes of said birefringent plates are perpendicular to one another, one of said slow axes being oriented parallel to the bisector of the directions of polarization fixed by said polarizers.

9. A device according to claim 7, wherein the slow axes of said birefringent plates are oriented parallel to the directions polarization fixed by said polarizers.

10. A device according to claim 7, wherein said parallel faces are parallel to said main faces.

11. A device according to claim 7, wherein the orientation of said parallel faces in relation to said main faces gives rise to said inclination.

12. A device according to claim 11, wherein the stacking of said liquid crystal layer, said compensating means, and said polarizers is achieved by interposing wedge-shaped refringent means.

13. A system for the projection of images on a screen comprising a projection lens, wherein said system comprises a display device according to claim 1 or 2, and wherein said display device includes a liquid crystal layer having its main faces perpendicular and centered with respect to the optical axis of said projection lens.

14. A display device, comprising:
- a first polarizer transmitting therethrough light having a first polarization direction;
- a second polarizer parallel with and opposing the first polarizer, the second polarizer transmitting therethrough light having a second polarization direction, the second polarization direction being perpendicular to the first polarization direction;
- a layer of twisted nematic liquid crystal parallel to and between the polarizers;
- a first birefringent layer extending in a plane that is parallel to and between the first and second polarizers;
- means for providing a voltage across the liquid crystal layer, comprising a pair of transparent electrodes opposing one another across the liquid crystal layer and a power source connected to the pair of transparent electrodes; and
- wherein the first birefringent layer has the property that it provides uniaxial negative birefringence along an axis that is inclined with respect to a normal to the plane in which the first birefringent layer extends.

* * * * *

(12) EX PARTE REEXAMINATION CERTIFICATE (9106th)
United States Patent
Haas

(10) Number: US 5,375,006 C1
(45) Certificate Issued: Jul. 3, 2012

(54) TWISTED NEMATIC LIQUID CRYSTAL DISPLAY DEVICES WITH OPTICAL AXIS OF BIREFRINGENT LAYER INCLINED WITH RESPECT TO BIREFRINGENT LAYER NORMAL

(75) Inventor: Gunther Haas, Meylan (FR)

(73) Assignee: Thomson Consumer Electronics S.A., Courbevoie (FR)

Reexamination Request:
No. 90/011,032, Jun. 14, 2010
No. 90/011,648, Apr. 18, 2011

Reexamination Certificate for:
Patent No.: 5,375,006
Issued: Dec. 20, 1994
Appl. No.: 08/080,873
Filed: Jun. 24, 1993

(30) Foreign Application Priority Data
Jun. 26, 1992 (FR) .......................................... 92 07831

(51) Int. Cl.
*G02F 1/13* (2006.01)
*G02F 1/139* (2006.01)

(52) U.S. Cl. .............................. 349/120; 349/117; 349/5
(58) Field of Classification Search ....................... None
See application file for complete search history.

(56) References Cited

To view the complete listing of prior art documents cited during the proceedings for Reexamination Control Numbers 90/011,032 and 90/011,648, please refer to the USPTO's public Patent Application Information Retrieval (PAIR) system under the Display References tab.

*Primary Examiner* — Pia Tibbits

(57) ABSTRACT

The disclosure relates to electrically controlled display devices that use the polarization rotation properties of twisted nematic liquid crystal layers. A display device comprises an optical cavity formed by two polarizers enclosing a layer of twisted nematic liquid crystal with which uniaxial birefringent means are associated in order to compensate for the residual birefringence of the liquid crystal layer which tends to reduce the contrast ratio of the display device. Thus, the homogeneity of the angular distribution of the contrast ratio is improved in relation to a device having no compensating means. The disclosed device can be applied in particular to data display devices for computers and to the display of television pictures directly or by projection.

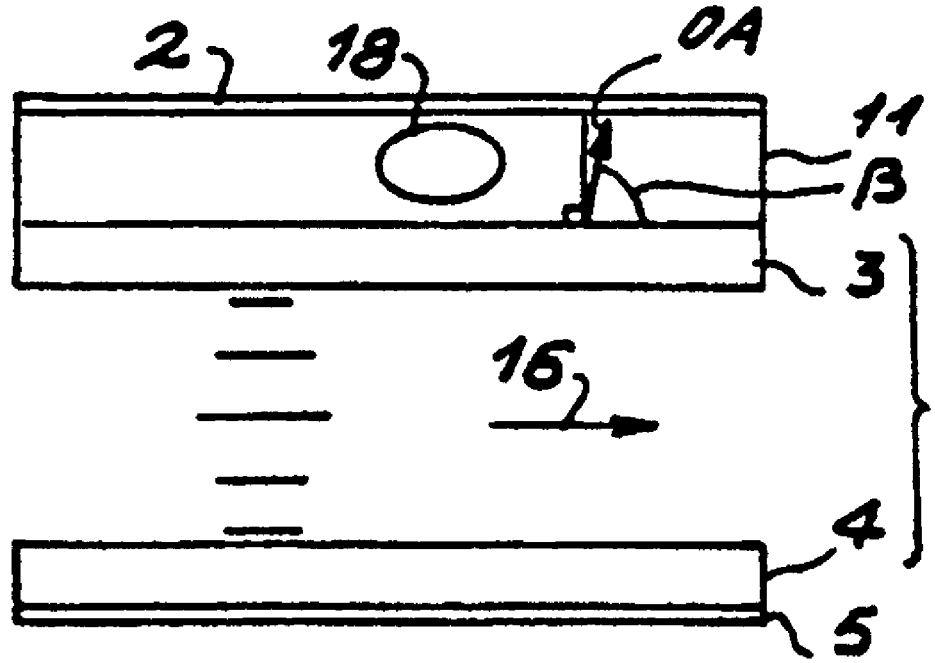

US 5,375,006 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 and 14 is confirmed.

New claims 15-22 are added and determined to be patentable.

Claims 11-13 were not reexamined.

15. *An electrically controlled display device comprising:*

*two polarizers having crossed polarization directions and configured to form an optical cavity;*

*a twisted nematic liquid (TNL) crystal layer positioned between the two polarizers and having two main faces;*

*a compensating layer within the optical cavity that has two parallel faces which are parallel to the two main faces of the TNL crystal layer, the compensating layer configured to provide uniaxial negative birefringence properties, the optical axis of said compensating layer having an inclination with respect to the normal (Z) of the two main faces of said TNL crystal layer;*

*wherein the molecular orientation of said TNL crystal layer, when there is no electrical control voltage, is adjusted to bring about a 90° rotation of the rectilinear polarization of a light wave that goes through the TNL crystal layer in the direction that is normal (Z) with respect to the two main faces of the TNL crystal layer; and*

*wherein each of the two polarizers is aligned with the rectilinear polarization of light at a respective one of the two main faces of the TNL crystal layer.*

16. *An electrically controlled display device comprising:*

*two polarizers having crossed polarization directions and configured to form an optical cavity;*

*a twisted nematic liquid (TNL) crystal layer positioned between the two polarizers and having two main faces;*

*a compensating layer within the optical cavity that has two parallel faces which are parallel to the two main faces of the TNL crystal layer, the compensating layer provides uniaxial negative birefringence properties, and its optical axis has an inclination with respect to the normal (Z) of the two main faces of said TNL crystal layer.*

17. *An electrically controlled display device comprising:*

*two polarizers having crossed polarization directions and configured to form an optical cavity;*

*a twisted nematic liquid (TNL) crystal layer positioned between the two polarizers and having two main faces;*

*a compensating layer within the optical cavity that has two parallel faces which are parallel to the two main faces of the TNL crystal layer, the compensating layer configured to provide uniaxial negative birefringence properties, the optical axis of said compensating layer having an inclination with respect to the normal (Z) of the two main faces of said TNL crystal layer;*

*wherein the molecular orientation of said TNL crystal layer, when there is no electrical control voltage, is adjusted to bring about a 90° rotation of the rectilinear polarization of a light wave passing through the TNL crystal layer in the direction that is normal (Z) with respect to the two main faces of the TNL crystal layer;*

*wherein each of the two polarizers is aligned with the rectilinear polarization of light at a respective one of the two main faces of the TNL crystal layer; and*

*wherein the compensating layer comprises a pair of uniaxial birefringent plates, each of said birefringent plates having parallel faces, said birefringent plates having orthogonal optical axes.*

18. *An electrically controlled display device comprising:*

*two polarizers having crossed polarization directions and configured to form an optical cavity;*

*a twisted nematic liquid (TNL) crystal layer positioned between the two polarizers and having two main faces;*

*a compensating layer within the optical cavity that has two parallel faces which are parallel to the two main faces of the TNL crystal layer, the compensating layer configured to provide uniaxial negative birefringence properties, the optical axis of said compensating layer having an inclination with respect to the normal (Z) of the two main faces of said TNL crystal layer; and*

*wherein said compensating layer comprises a pair of uniaxial birefringent plates, each of said birefringent plates having parallel faces, said birefringent plates having orthogonal optical axes.*

19. *An electrically controlled display device comprising:*

*two polarizers having crossed polarization directions and configured to form an optical cavity;*

*a twisted nematic liquid (TNL) crystal layer positioned between the two polarizers and having two main faces;*

*a compensating layer within the optical cavity that has two parallel faces which are parallel to the two main faces of the TNL crystal layer, the compensating layer configured to provide uniaxial negative birefringence properties, the optical axis of said compensating layer having an inclination with respect to the normal (Z) of the two main faces of said TNL crystal layer;*

*wherein the molecular orientation of said TNL crystal layer, when there is no electrical control voltage, is adjusted to bring about a 90° rotation of the rectilinear polarization of a light wave that goes through the TNL crystal layer in the direction that is normal (Z) with respect to the two main faces of the TNL crystal layer;*

*wherein each of the two polarizers is aligned with the rectilinear polarization of light at a respective one of the two main faces of the TNL crystal layer;*

*wherein the compensating layer comprises a pair of uniaxial birefringent plates, each of said birefringent plates having parallel faces, said birefringent plates having orthogonal optical axes; and*

*wherein the slow axes of said birefringent plates are perpendicular to one another, one of said slow axes being oriented parallel to a bisector of the directions of polarization fixed by the two polarizers.*

20. *An electrically controlled display device comprising:*

*two polarizers having crossed polarization directions and configured to form an optical cavity;* a twisted nematic liquid (TNL) crystal layer positioned between the two polarizers and having two main faces;

a compensating layer within the optical cavity that has two parallel faces which are parallel to the two main faces of the TNL crystal layer, the compensating layer configured to provide uniaxial negative birefringence properties, the optical axis of said compensating layer having an inclination with respect to the normal (Z) of the two main faces of said TNL crystal layer;

wherein said compensating layer comprises a pair of uniaxial birefringent plates, each of said birefringent plates having parallel faces, said birefringent plates having orthogonal optical axes; and wherein the slow axes of the birefringent plates are perpendicular to one another, one of the slow axes being oriented parallel to a bisector of the directions of polarization fixed by the two polarizers.

21. A display device, comprising:

a first polarizer transmitting therethrough light having a first polarization direction;

a second polarizer parallel with and opposing the first polarizer, the second polarizer transmitting therethrough light having a second polarization direction, the second polarization direction being perpendicular to the first polarization direction;

a layer of twisted nematic liquid crystal parallel to and between the polarizers;

a first birefringent layer extending in a plane that is parallel to and between the first and second polarizers;

means for providing a voltage across the liquid crystal layer, comprising a pair of transparent electrodes opposing one another across the liquid crystal layer and a power source connected to the pair of transparent electrodes; and wherein the first birefringent layer is a discotic liquid crystal and has the property that it provides uniaxial negative birefringence along an axis that is inclined with respect to a normal to the plane in which the first birefringent layer extends.

22. A display device of claim 21, wherein the first birefringent layer has a homogeneous pre-inclination.

\* \* \* \* \*